United States Patent
Sun (10) Patent No.: US 10,099,712 B1
(45) Date of Patent: Oct. 16, 2018

(54) SINGLE-CROSS TRANSLATIONAL WAGON

(71) Applicant: Blue Ridge Recreational Gear, LLC, Tybee Island, GA (US)

(72) Inventor: Benlong Sun, Zhejiang (CN)

(73) Assignee: Blue Ridge Recreational Gear, LLC, Tybee Island, GA (US)

( * ) Notice: Subject to any disclaimer, the term of this patent is extended or adjusted under 35 U.S.C. 154(b) by 0 days.

(21) Appl. No.: 15/833,642

(22) Filed: Dec. 6, 2017

(30) Foreign Application Priority Data

| Jun. 9, 2017 | (CN) | 2017 1 0449973 |
| Jun. 9, 2017 | (CN) | 2017 1 0449974 |
| Jun. 9, 2017 | (CN) | 2017 2 0694905 U |
| Jun. 9, 2017 | (CN) | 2017 2 0694971 U |
| Jun. 9, 2017 | (CN) | 2017 2 0694972 U |
| Jun. 9, 2017 | (CN) | 2017 2 0694973 U |
| Jun. 9, 2017 | (CN) | 2017 2 0694974 U |
| Jun. 9, 2017 | (CN) | 2017 2 0694975 U |
| Jun. 9, 2017 | (CN) | 2017 2 0695021 U |
| Jun. 9, 2017 | (CN) | 2017 2 0695022 U |

(Continued)

(51) Int. Cl.
*B62B 3/02* (2006.01)
*B62B 5/06* (2006.01)

(52) U.S. Cl.
CPC .............. *B62B 3/025* (2013.01); *B62B 5/067* (2013.01)

(58) Field of Classification Search
CPC . B62B 3/007; B62B 2205/06; B62B 2202/52; B62B 3/02; B62B 3/002; B62B 3/0251
See application file for complete search history.

(56) References Cited

U.S. PATENT DOCUMENTS

| 605,224 | A | * | 6/1898 | Green | B62B 3/02 |
| | | | | | 280/640 |
| 1,779,742 | A | * | 10/1930 | Lines | B62B 7/10 |
| | | | | | 280/649 |

(Continued)

FOREIGN PATENT DOCUMENTS

WO WO 2017088535 A1 6/2017
WO WO 2017088536 A1 6/2017

OTHER PUBLICATIONS

Amazon results for creative design wagon.
(Continued)

*Primary Examiner* — Brian L Swenson
(74) *Attorney, Agent, or Firm* — WPAT, P.C., Intellectual Property Attorneys; Anthony King (57) ABSTRACT

A single-cross translational wagon having a tow bar assembly, a single-cross folding assembly, a bottom frame folding assembly, front wheel assemblies and rear wheel assemblies. The tow bar assembly is arranged in front of the single-cross folding assembly. The bottom frame folding assembly is arranged below the single-cross folding assembly. The single-cross folding assembly has a cross inner frame, a cross outer frame, a front wheel supporting tube and a rear wheel supporting tube. The cross inner frame includes an upper cross inner frame part (is in a backward U shape) and first lower cross tubes. The rear ends of the left and right sides of the upper cross inner frame part include the two first lower cross tubes front ends are hinged with the front ends of the first lower cross tubes and the rear ends are hinged with the lower end of the rear wheel supporting tube.

22 Claims, 8 Drawing Sheets

(30) Foreign Application Priority Data

| Jun. 9, 2017 | (CN) | 2017 2 0695023 U |
| Jul. 27, 2017 | (CN) | 2017 2 0948557 U |
| Sep. 26, 2017 | (CN) | 2017 0 914444 |
| Sep. 26, 2017 | (CN) | 2017 2 1287017 U |
| Sep. 26, 2017 | (CN) | 2017 2 1287018 U |
| Sep. 26, 2017 | (CN) | 2017 2 1287020 U |
| Sep. 26, 2017 | (CN) | 2017 2 1287427 U |

(56) References Cited

U.S. PATENT DOCUMENTS

| 4,705,247 | A | * | 11/1987 | Delmerico | A47B 31/04 248/98 |
| D411,387 | S | | 6/1999 | Zheng | |
| 5,975,626 | A | | 11/1999 | Aycock | |
| D432,325 | S | | 10/2000 | Zheng et al. | |
| D432,823 | S | | 10/2000 | Zheng | |
| D433,244 | S | | 11/2000 | Zheng | |
| D433,574 | S | | 11/2000 | Zheng | |
| 6,158,361 | A | | 12/2000 | Zheng et al. | |
| 6,231,119 | B1 | | 5/2001 | Zheng | |
| 6,234,089 | B1 | | 5/2001 | Zheng et al. | |
| 6,237,993 | B1 | | 5/2001 | Zheng | |
| 6,241,311 | B1 | | 6/2001 | Zheng | |
| 6,247,748 | B1 | | 6/2001 | Zheng | |
| 6,296,304 | B1 | | 10/2001 | Zheng | |
| 6,302,479 | B1 | | 10/2001 | Zheng | |
| 6,364,411 | B1 | | 4/2002 | Zheng | |
| 6,494,530 | B1 | | 12/2002 | Zheng | |
| D515,830 | S | | 2/2006 | Zheng | |
| D516,825 | S | | 3/2006 | Zheng | |
| D516,826 | S | | 3/2006 | Zheng | |
| D517,819 | S | | 3/2006 | Zheng | |
| 7,100,975 | B1 | | 9/2006 | Zheng | |
| 7,328,940 | B2 | | 2/2008 | Zheng | |
| 7,396,073 | B2 | | 7/2008 | Zheng | |
| 7,441,287 | B2 | | 10/2008 | Zheng | |
| 9,073,564 | B2 | | 7/2015 | Yang et al. | |
| 9,145,154 | B1 | * | 9/2015 | Horowitz | B62B 3/025 |
| 9,211,897 | B2 | | 12/2015 | Yang et al. | |
| 9,855,962 | B1 | * | 1/2018 | Chen | B62B 3/022 |
| 2006/0091625 | A1 | * | 5/2006 | Naude, Jr. | B62B 3/022 280/33.991 |
| 2010/0090444 | A1 | * | 4/2010 | Chen | B62B 3/007 280/651 |
| 2017/0259838 | A1 | * | 9/2017 | Choi | B62B 3/025 |

OTHER PUBLICATIONS

Amazon results for "Mac Sports Collapsible Folding Outdoor Utility Wagon".
Amazon results for "Rio Wagon".

* cited by examiner

SINGLE-CROSS TRANSLATIONAL WAGON

PRIORITY/RELATED DOCUMENTS

This patent application incorporates by reference in their entireties and claims priority to these co-pending Chinese patent applications filed on Jun. 9, 2017; namely, Application Nos. 201720694971.X; 201720694972.4; 201710449974.1; 201720695021.9; 201720694974.3; 201720695022.3; 201720695023.8; 201720694975.8; 201720694905.2; 201710449973.7; 201720694973.9; and the one filed on Jul. 27, 2017, namely, Application No. 201720948557.7 and all entitled the following; namely, one or more version of a pull-cart; namely "Translational Collapsible Wagon (Chinese Translation)," "Folding Collapsible Wagon (Chinese Translation)" and co-pending Chinese patent applications filed on Sep. 26, 2017; namely, Application Nos. 20170914444.X, 201721287020.7, 201721287018.X, 201721287017.5, and 201721287427.X all entitled the following; namely, "Single-Cross Translational Wagon (Chinese Translation) all with the same inventor(s) as herein application.

COPYRIGHT NOTICE

This disclosure contains material which is subject to copyright protection. The copyright owner makes no objection to reproduction of this disclosure as disclosed in the Patent and Trademark Office files, record, or the like. Otherwise, the copyright owner reserves all copyright rights whatsoever for this patent disclosure. 37 CFR 1.71(d).

BACKGROUND OF THE UTILITY MODEL

The following information may be useful in a better understanding of this disclosure. Please note that information contained in this section is not an admission that the information provided is material or prior art to this disclosure or as described in claimed disclosure, or that any publication or document that is specifically, implicitly or otherwise referenced is prior art.

1. Technical Field

The utility model relates to the technical field of wagons, in particular to a single-cross translational wagon.

2. Description of Related Art

According to most translational collapsible wagons on the market, two steel tubes with the same length are riveted together to form an X-shaped assembly after holes are punched in the centers of the steel tubes. Although the structure is simple, since the steel tubes are connected front and back in an overlapping mode, after a wagon is assembled, brackets mounted with the X-shaped assemblies have to be staggered up and down by the distance of one steel tube. Consequentially, this staggered mounting arrangement adversely affects the following wagon attributes; namely, reduced attractiveness when the wagon is being folded or unfolded, and narrowing of available space and volume capacity of the wagon.

BRIEF SUMMARY OF THE UTILITY MODEL

For overcoming the defects that an existing wagon including being inconvenient to fold and complex in structure, and occupying a large space, the disclosure utility model herein provides a single-cross translational wagon which is simple in structure, low in cost and capable of being folded flexibly.

According to the technical scheme adopted by the utility model for solving the technical problems:

In one aspect of an embodiment, a single translational wagon is disclosed including: a tow bar assembly, a single-cross folding assembly, a bottom frame folding assembly, front wheel assemblies and rear wheel assemblies. In some embodiments, the tow bar assembly is arranged in front of the single-cross folding assembly, and the bottom frame folding assembly is arranged below the single-cross folding assembly.

In some embodiments, the single-cross folding assembly comprises a cross inner frame, a cross outer frame, a front wheel supporting tube and a rear wheel supporting tube, the cross inner frame comprises an upper cross inner frame part and first lower cross tubes, the upper cross inner frame part is in a U shape which is open backwards, the rear ends of the left and right sides of the upper cross inner frame part are provided with the two first lower cross tubes respectively and hinged with the front ends of the first lower cross tubes, and the rear ends of the first lower cross tubes are hinged with the lower end of the rear wheel supporting tube.

In some embodiments, the cross outer frame comprises an upper cross outer frame part and second lower cross tubes. In an example, the upper cross outer frame part is in a U shape which is open forwards. In an example, the front ends of the left and right sides of the upper cross outer frame part are provided with the two second lower cross tubes respectively and hinged with the rear ends of the second lower cross tubes, the front ends of the second lower cross tubes are hinged with the lower end of the front wheel supporting tube, the second lower cross tubes are located on the outer sides of the first lower cross tubes and hinged with the first lower cross tubes in an X shape.

In some embodiments, the left and right sides of the front end of the upper cross inner frame part are hinged with the upper end of the front wheel supporting tube respectively. In one or more examples, the front wheel assemblies are mounted at the bottom of the front wheel supporting tube. the left and right sides of the rear end of the upper cross outer frame part are hinged with the upper end of the rear wheel supporting tube respectively, and the rear wheel assemblies are mounted at the bottom of the rear wheel supporting tube.

In some embodiments, the bottom frame folding assembly includes a front bottom frame assembly and a rear bottom frame assembly. In some embodiments, the front bottom frame assembly and the rear bottom frame assembly are symmetrical front and back and can be turned downwards by 90 degrees to be hinged together.

In some embodiments, the front bottom frame assembly comprises two bottom frame front longitudinal tubes, and the two bottom frame front longitudinal tubes are arranged symmetrically left and right and narrowed inwards from front to back. In an example, the rear bottom frame assembly includes two bottom frame rear longitudinal tubes, and the two bottom frame rear longitudinal tubes are arranged symmetrically left and right and narrowed inwards from front to back.

In some embodiments, front longitudinal tube grooved components, which are open downwards, are arranged at the rear ends of the two bottom frame front longitudinal tubes respectively, rear longitudinal tube axle sleeves are arranged at the front ends of the two bottom frame rear longitudinal tubes respectively, the front ends of the two bottom frame rear longitudinal tubes are inserted into grooves of the front longitudinal tube grooved components of the two bottom frame front longitudinal tubes respectively.

In some embodiments, meanwhile, the rear longitudinal tube axle sleeves are hinged into round holes in the front longitudinal tube grooved components through rivets respectively; the front ends of the two bottom frame front longitudinal tubes are hinged with the front wheel supporting tube respectively, and the rear ends of the two bottom frame rear longitudinal tubes are hinged with the rear wheel supporting tube respectively.

In some embodiments, long bottom frame crossbeams and short bottom frame crossbeams are arranged between the two bottom frame front longitudinal tubes and between the two bottom frame rear longitudinal tubes respectively, and the short bottom frame crossbeams are arranged on the corresponding narrowed sections.

In some embodiments, the upper cross inner frame part and the upper cross outer frame part are arranged symmetrically front and back, and the left and right sides of the upper cross inner frame part and the left and right sides of the upper cross outer frame part are all arranged horizontally.

In some embodiments, the front wheel supporting tube and the rear wheel supporting tube are each in a U shape which is open upwards.

In some embodiments, first hinge bases are mounted at the rear ends of the left and right sides of the upper cross inner frame part respectively, second hinge bases are mounted at the front ends of the first lower cross tubes, and the second hinge bases are hinged with the first hinge bases through rivets.

In some embodiments, third hinge bases are mounted at the front ends of the left and right sides of the upper cross outer frame part respectively, fourth hinge bases are mounted at the rear ends of the second lower cross tubes, and the fourth hinges are hinged with the third hinge bases through rivets.

In an example, the tow bar assembly is a steel ball tow bar assembly.

In some embodiments, each front wheel assembly includes a front wheel, a front wheel carrier and a front wheel axle. For example, the front wheel is mounted on the front wheel carrier, the lower end of the front wheel axle is welded to the front wheel carrier, the upper end of the front wheel axle penetrates through the bottom of the front wheel supporting tube from bottom to top to be connected with a nut in a screwed mode, and gaskets are arranged between the nut and the front wheel supporting tube, as well as between the front wheel supporting tube and the front wheel axle;

In some embodiments, each rear wheel assembly includes a rear wheel, a rear wheel carrier, a rear wheel axle and a rear wheel axle fixing piece. In an example, the rear wheel is mounted on the rear wheel carrier, the lower end of the rear wheel axle is welded to the rear wheel carrier, the upper end of the rear wheel axle penetrates through the bottom of the rear wheel carrier fixing piece from bottom to top to be connected with a nut in a screwed mode, and the lower end of the rear supporting tube is hinged with the rear wheel carrier fixing piece.

In some embodiments, each front wheel assembly includes a front wheel, a front wheel carrier, a front wheel axle and a detachable front wheel structure. For example, the front wheel is mounted on the front wheel carrier, the lower end of the front wheel axle is welded to the front wheel carrier, an annular groove is formed in the upper end of the front wheel axle, the detachable front wheel structure includes a front wheel axle sleeve, a front wheel plastic bushing, a front wheel steel wire clamp and a front wheel clamp holder.

In some embodiments, the front wheel plastic bushing is inlaid in the front wheel axle sleeve, the side wall of the front wheel axle sleeve is welded to the front wheel supporting tube, the front wheel steel wire clamp is in a U shape with the two side edges in concave V shapes and is mounted on the front wheel clamp holder in an openable mode.

In some embodiments, the front wheel clamp holder includes an upper portion and a lower portion, a guide post matched with the front wheel steel wire clamp is arranged in the space, between the upper portion and the lower portion of the front wheel clamp holder, which is used for mounting the front wheel steel wire clamp the upper portion and the lower portion of the front wheel clamp holder are connected through the guide post, and center round holes are further formed in the bottoms of the upper portion and the lower portion of the front wheel clamp holder and communicate with the space used for mounting the front wheel steel wire clamp. In one or more embodiments, the upper end of the front wheel axle sequentially penetrates through the front wheel plastic bushing and the front wheel steel wire clamp from bottom to top to be matched with the center round holes in the front wheel clamp holder, and meanwhile, the front wheel steel wire clamp is clamped in the annular groove in the front wheel axle.

In some embodiments, each rear wheel assembly comprises a rear wheel, a rear wheel carrier, a rear wheel axle and a detachable rear wheel structure. In one example, the rear wheel is mounted on the rear wheel carrier, the lower end of the rear wheel axle is welded to the rear wheel carrier, and an annular groove is formed in the upper end of the rear wheel axle. In some embodiments, the detachable rear wheel structure includes a rear wheel axle sleeve, a rear wheel plastic bushing, a rear wheel steel wire clamp and a rear wheel clamp holder.

In an example, the rear wheel plastic bushing is inlaid in the rear wheel axle sleeve. In an example, the rear wheel steel wire clamp is in a U shape with the two side edges in concave V shapes and is mounted on the rear wheel clamp holder in an openable mode. In another example, the rear wheel clamp holder comprises an upper portion and a lower portion, a guide post matched with the rear wheel steel wire clamp is arranged in the space between the upper portion and the lower portion of the rear wheel clamp holder, which is used for mounting the rear wheel steel wire clamp.

In some embodiments, the upper portion and the lower portion of the rear wheel clamp holder are connected through the guide post, and center round holes are further formed in the bottoms of the upper portion and the lower portion of the rear wheel clamp holder and communicate with the space used for mounting the rear wheel steel wire clamp. In some embodiments, the upper end of the rear wheel axle sequentially penetrates through the bottom of the rear wheel supporting tube, the rear wheel plastic bushing and the rear wheel steel wire clamp from bottom to top to be matched with the center round holes in the rear wheel clamp holder, and meanwhile, the rear wheel steel wire clamp is clamped in the annular groove in the rear wheel axle.

The single translational wagon of the utility model mainly has the beneficial effects that the X-shaped single-cross structure is adopted and is simplified compared with an X-shaped double-cross structure and an X-shaped multi-cross structure, so that the number of parts of the wagon is greatly reduced, and the wagon is simple in structure, capable of being folded flexibly and lower in cost.

DETAILED DESCRIPTION OF THE UTILITY MODEL

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

A further description of the present disclosure is given with the accompanying drawings.

Now referring to FIGS. 1-23, a single-cross translational wagon is disclosed including a tow bar assembly, a single-cross folding assembly, a bottom frame folding assembly, and front wheel assemblies and rear wheel assemblies. In some embodiments, the tow bar assembly is arranged in front of the single-cross folding assembly, and the bottom frame folding assembly is arranged below the single-cross folding assembly. In some embodiments, the single-cross folding assembly comprises a cross inner frame, a cross outer frame, a front wheel supporting tube 11 and a rear wheel supporting tube 17.

In one example, the cross inner frame includes an upper cross inner frame part 8 and first lower cross tubes, the upper cross inner frame part 8 is in a U shape which is open backwards, the rear ends of the left and right sides of the upper cross inner frame part 8 are provided with the two first lower cross tubes respectively and hinged with the front ends of the first lower cross tubes, and the rear ends of the first lower cross tubes are hinged with the lower end of the rear wheel supporting tube 17.

In some embodiments, the cross outer frame comprises an upper cross outer frame part 16 and second lower cross tubes, the upper cross outer frame part 16 is in a U shape which is open forwards, the front ends of the left and right sides of the upper cross outer frame part 16 are provided with the two second lower cross tubes respectively and hinged, in one example, with the rear ends of the second lower cross tubes. In one or more examples, the front ends of the second lower cross tubes are hinged with the lower end of the front wheel supporting tube 11, the second lower cross tubes are located on the outer sides of the first lower cross tubes and hinged with the first lower cross tubes in an X shape.

In some embodiments, the left and right sides of the front end of the upper cross inner frame part 8 are hinged with the upper end of the front wheel supporting tube 11 respectively, and the front wheel assemblies are mounted at the bottom of the front wheel supporting tube 1. In an example, the left and right sides of the rear end of the upper cross outer frame part 16 are hinged with the upper end of the rear wheel supporting tube 17 respectively, and the rear wheel assemblies are mounted at the bottom of the rear wheel supporting tube 17.

In some embodiments, the bottom frame folding assembly comprises a front bottom frame assembly 12 and a rear bottom frame assembly 15. In an example, the front bottom frame assembly 12 and the rear bottom frame assembly 15 are symmetrical front and back and can be turned downwards by 90 degrees to be hinged together.

Furthermore, in some embodiments, the front bottom frame assembly 12 comprises two bottom frame front longitudinal tubes 20, and the two bottom frame front longitudinal tubes 20 are arranged symmetrically left and right and narrowed inwards from front to back. In an example, the rear bottom frame assembly 15 comprises two bottom frame rear longitudinal tubes 23, and the two bottom frame rear longitudinal tubes 23 are arranged symmetrically left and right and narrowed inwards from front to back. In some embodiments, front longitudinal tube grooved components 24 which are open downwards are arranged at the rear ends of the two bottom frame front longitudinal tubes 20 respectively.

In some embodiments, rear longitudinal tube axle sleeves 25 are arranged at the front ends of the two bottom frame rear longitudinal tubes 23 respectively, the front ends of the two bottom frame rear longitudinal tubes 23 are inserted into grooves of the front longitudinal tube grooved components 24 of the two bottom frame front longitudinal tubes 20 respectively. Meanwhile, in an example, the rear longitudinal tube axle sleeves 25 are hinged into round holes in the front longitudinal tube grooved components 24 through rivets 26 respectively. In an example, the front ends of the two bottom frame front longitudinal tubes 20 are hinged with the front wheel supporting tube 11 respectively, and the rear ends of the two bottom frame rear longitudinal tubes 23 are hinged with the rear wheel supporting tube 17 respectively.

In some embodiments, long bottom frame crossbeams 21 and short bottom frame crossbeams 22 are arranged between the two bottom frame front longitudinal tubes 20 and between the two bottom frame rear longitudinal tubes 23 respectively, and the short bottom frame crossbeams 21 are arranged on the corresponding narrowed sections. Furthermore, in some embodiments, the upper cross inner frame part 8 and the upper cross outer frame part 16 are arranged symmetrically front and back, and the left and right sides of the upper cross inner frame part 8 and the left and right sides of the upper cross outer frame part 16 are all arranged horizontally.

Furthermore, in some embodiments, the front wheel supporting tube 11 and the rear wheel supporting tube 17 are each in a U shape which is open upwards. Furthermore, in some embodiments, first hinge bases are mounted at the rear ends of the left and right sides of the upper cross inner frame part 8 respectively, second hinge bases are mounted at the front ends of the first lower cross tubes, and the second hinge bases are hinged with the first hinge bases through rivets; and third hinge bases are mounted at the front ends of the left and right sides of the upper cross outer frame part 16 respectively, fourth hinge bases are mounted at the rear ends of the second lower cross tubes, and the fourth hinges are hinged with the third hinge bases through rivets. Furthermore, in one example, the tow bar assembly is a steel ball tow bar assembly.

Furthermore, each front wheel assembly comprises a front wheel, a front wheel carrier and a front wheel axle, wherein the front wheel is mounted on the front wheel carrier, the lower end of the front wheel axle is welded to the front wheel carrier, the upper end of the front wheel axle penetrates through the bottom of the front wheel supporting tube from bottom to top to be connected with a nut in a screwed mode, and gaskets are arranged between the nut and the front wheel supporting tube as well as between the front wheel supporting tube and the front wheel axle.

In some embodiments, each rear wheel assembly comprises a rear wheel, a rear wheel carrier, a rear wheel axle and a rear wheel carrier fixing piece, wherein the rear wheel is mounted on the rear wheel carrier, the lower end of the rear wheel axle is welded to the rear wheel carrier, the upper end of the rear wheel axle penetrates through the bottom of the rear wheel carrier fixing piece from bottom to top to be connected with a nut in a screwed mode, and the lower end of the rear supporting tube is hinged with the rear wheel carrier fixing piece.

In some embodiments, each front wheel assembly comprises a front wheel, a front wheel carrier 9, a front wheel axle and a detachable front wheel structure. In one example, the front wheel is mounted on the front wheel carrier 9, the lower end of the front wheel axle is welded to the front wheel carrier 9, and an annular groove is formed in the upper end of the front wheel axle. In some embodiments, the detachable front wheel structure comprises a front wheel axle sleeve 30, a front wheel plastic bushing 29, a front wheel steel wire clamp and a front wheel clamp holder, the front wheel plastic bushing 29 is inlaid in the front wheel axle sleeve 31, and the side wall of the front wheel axle sleeve 31 is welded to the front wheel supporting tube 11.

In some embodiments, the front wheel steel wire clamp is in a U shape with the two side edges in concave V shapes and is mounted on the front wheel clamp holder in an openable mode, the front wheel clamp holder comprises an upper portion and a lower portion, a guide post matched with the front wheel steel wire clamp is arranged in the space used for mounting the front wheel steel wire clamp between the upper portion and the lower portion of the front wheel clamp holder. In an example, the upper portion and the lower portion of the front wheel clamp holder are connected through the guide post, and center round holes are further formed in the bottoms of the upper portion and the lower portion of the front wheel clamp holder and communicate with the space used for mounting the front wheel steel wire clamp. In some embodiments, the upper end of the front wheel axle sequentially penetrates through the front wheel plastic bushing 29 and the front wheel steel wire clamp from bottom to top to be matched with the center round holes in the front wheel clamp holder, and meanwhile, the front wheel steel wire clamp is clamped in the annular groove in the front wheel axle;

In some embodiments, each rear wheel assembly comprises a rear wheel, a rear wheel carrier 19, a rear wheel axle and a detachable rear wheel structure. In an example, the rear wheel is mounted on the rear wheel carrier 19, the lower end of the rear wheel axle is welded to the rear wheel carrier 19, and an annular groove is formed in the upper end of the rear wheel axle. In an example, the detachable rear wheel structure includes a rear wheel axle sleeve 32, a rear wheel plastic bushing 30, a rear wheel steel wire clamp and a rear wheel clamp holder, and the rear wheel plastic bushing 30 is inlaid in the rear wheel axle sleeve the rear wheel steel wire clamp is in a U shape with the two side edges in concave V shapes and is mounted on the rear wheel clamp holder in an openable mode. In some embodiments, the rear wheel clamp holder includes an upper portion and a lower portion, and a guide post matched with the rear wheel steel wire clamp is arranged in the space, between the upper portion and the lower portion of the rear wheel clamp holder, used for mounting the rear wheel steel wire clamp.

In one example, the upper portion and the lower portion of the rear wheel clamp holder are connected through the guide post, and center round holes are further formed in the bottoms of the upper portion and the lower portion of the rear wheel clamp holder and communicate with the space used for mounting the rear wheel steel wire clamp. In an example, the upper end of the rear wheel axle sequentially penetrates through the bottom of the rear wheel supporting tube 17, the rear wheel plastic bushing 30 and the rear wheel steel wire clamp from bottom to top to be matched with the center round holes in the rear wheel clamp holder. In some embodiments, meanwhile, the rear wheel steel wire clamp is clamped in the annular groove in the rear wheel axle.

In some embodiments, lower cross tubes 14 include the first lower cross tubes and the second lower cross tubes. In an instance, the hinge points of the upper cross inner frame part 8 and the first lower cross tubes and the hinge points of the upper cross outer frame part 16 and the second lower cross tubes are arranged symmetrically front and back. In some embodiments, the hinge points of the second lower cross tubes and the first lower cross tubes are located below the central positions between the hinge points of the upper cross inner frame part 8 and the first lower cross tubes and the hinge points of the upper cross outer frame part 16 and the second lower cross tubes.

In some embodiments, hinge bases include the first hinge bases, the second hinge bases, the third hinge bases, and the fourth hinge bases. In some embodiments, tires 10 include the front wheels and the rear wheels. In some embodiments, steel wire clamps 27 include the front wheel steel wire clamps and the rear wheel steel wire clamps. In some instance, clamp holders 28 including the front wheel clamp holders and the rear wheel clamp holders.

Figure 1:
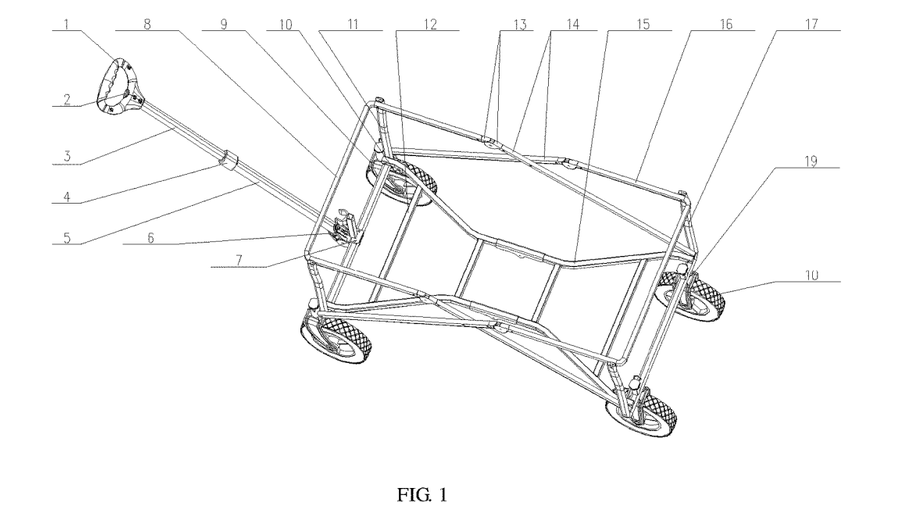
FIG. 1 is a structure schematic diagram of the first embodiment of the utility model.
Figure 2:
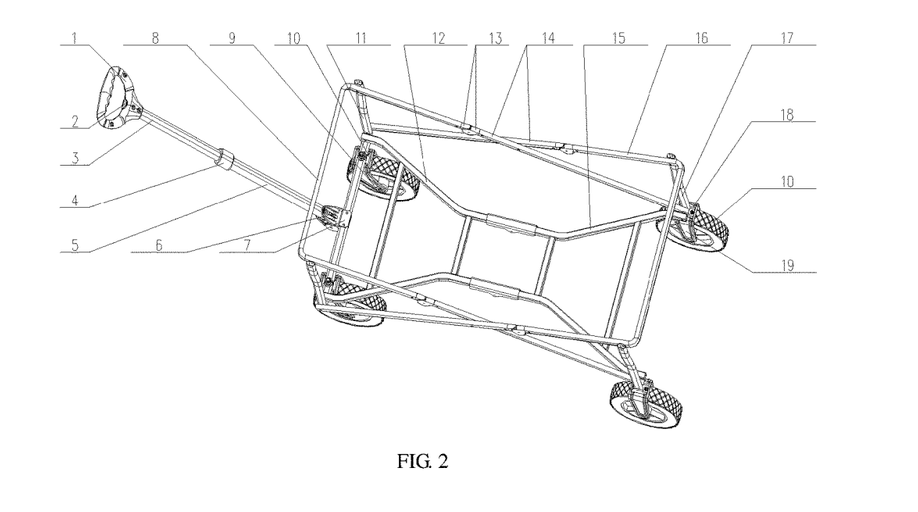
FIG. 2 is a structure schematic diagram of the second embodiment of the utility model.
Figure 3:
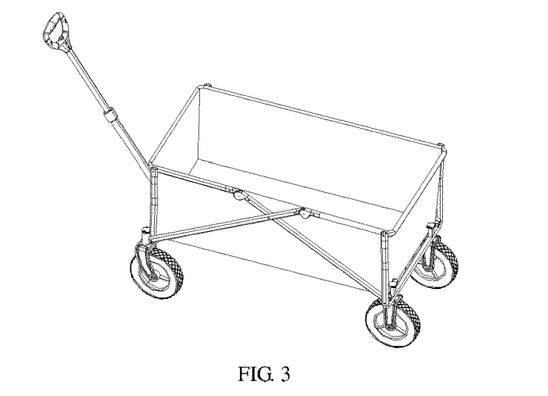
FIG. 3 is a schematic diagram of FIG. 1 with a cloth cover.

As is shown in FIG. 1 and FIG. 2, the wagon is composed of a steel ball tow bar assembly, a single-cross folding assembly, a bottom frame folding assembly, front wheel assemblies and rear wheel assemblies.

When the steel ball tow bar assembly is stretched, a handle 1 is lifted upwards. An upper tow bar 3 riveted on the handle 1 is driven and pulled out of a lower tow bar 5 till a steel ball in the upper tow bar 3 is ejected into a limiting hole in the lower tow bar 5. At the moment, a limiting component on the upper tow bar 3 abuts against an upper tow bar limiting base 4 at the end opening of the lower tow bar 5, and thus an auxiliary limiting function is achieved.

When the steel ball tow bar assembly retracts, a handle key 2 is pressed first. The steel ball, in the upper tow bar 3, is ejected into the limiting hole of the lower tow bar 5 and returns into the upper tow bar 3 for relieving limiting, and then the handle 1 is pressed to make the upper tow bar 3 retreat into the lower tow bar 5 till the lower plane of the handle 1 abuts against the upper tow bar limiting base 4.

At the moment, a tow bar fixing base 7 fixed to the middle of the front wheel supporting tube 11 is riveted with a tow bar limiting base 6, which is integrally connected with the lower tow bar 5, and the tow bar limiting base 6 can rotate around the axis of a rivet and can stop at any position. For further information on this feature, please refer to the steel ball tow bar mechanism disclosed in the patent with the application No. 201720695023.8 for a detailed structure.

Figure 9:
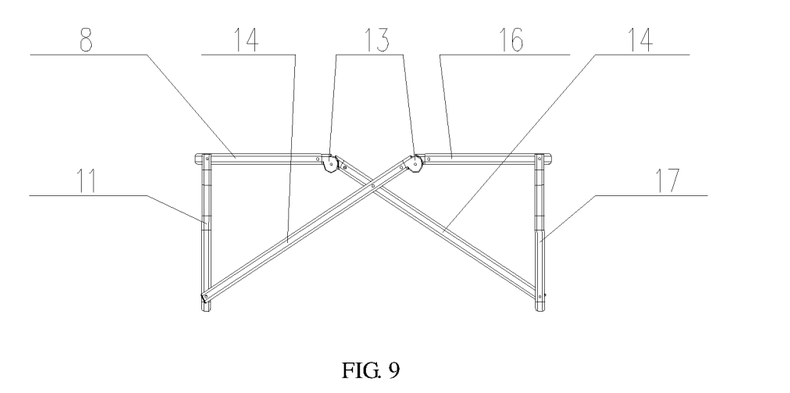
FIG. 9 is a diagram of a single-cross folding assembly in the completely-unfolded state in FIG. 1.
Figure 10:
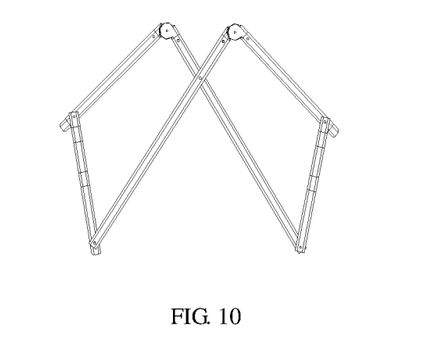
FIG. 10 is a diagram of the single-cross folding assembly in the half-unfolded state in FIG. 1.
Figure 11:
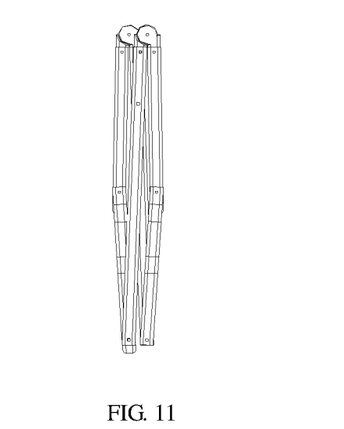
FIG. 11 is a diagram of the single-cross folding assembly in the completely-folded state in FIG. 1.
Figure 12:
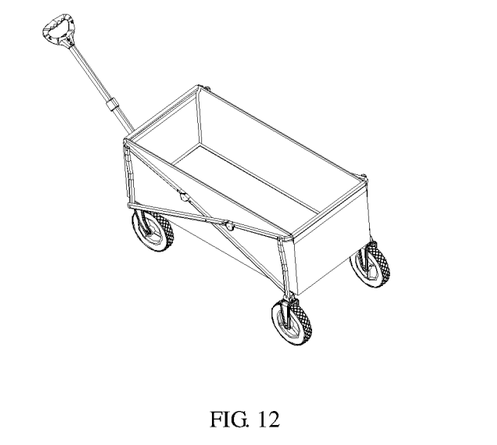
FIG. 12 is a schematic diagram of FIG. 2 with a cloth cover.
Figure 18:
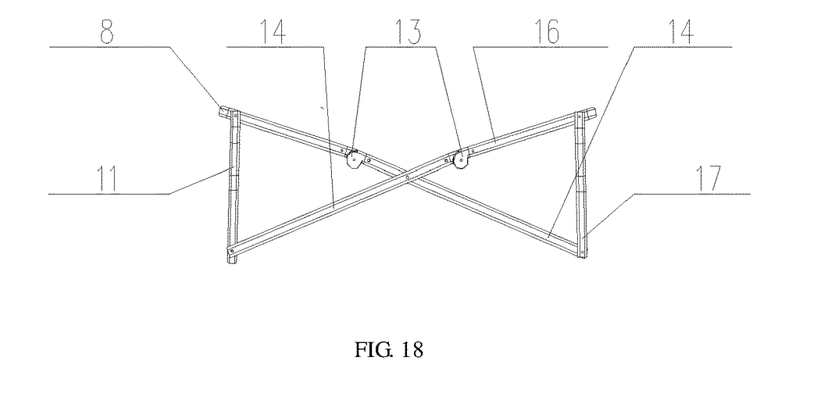
FIG. 18 is a diagram of a single-cross folding assembly in the completely-unfolded state in FIG. 2.
Figure 19:
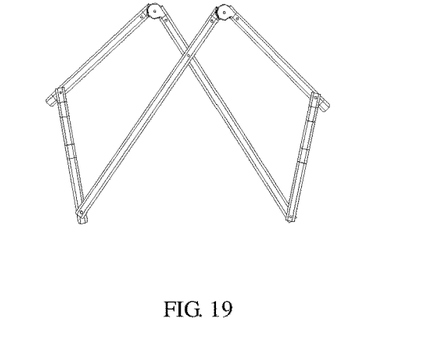
FIG. 19 is a diagram of the single-cross folding assembly in the half-unfolded state in FIG. 2.
Figure 20:
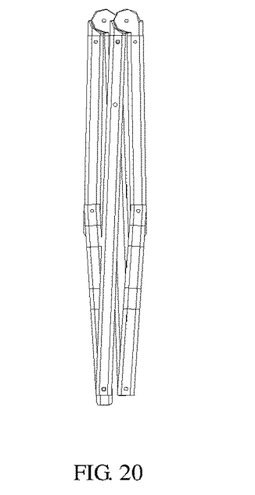
FIG. 20 is a diagram of the single-cross folding assembly in the completely-folded state in FIG. 2.

As is shown in FIG. 9 and FIG. 18, the single-cross folding assembly includes a cross inner frame, a cross outer frame, a front wheel supporting tube 11 and a rear wheel supporting tube 17.

The cross inner frame is formed by connecting hinge base 13 fixed to one end of the upper cross inner frame part 8 with hinge bases 13 fixed to the corresponding lower cross tubes 14 through rivets. The cross outer frame is formed by connecting hinge bases 13 fixed to one end of the upper cross outer frame part 16 with hinge bases 13 fixed to the corresponding lower cross tubes 14 through rivets. The X-shaped single-cross structure is formed by first connecting the lower cross tubes 14 in the cross inner frame with the lower cross tubes 14 in the cross outer frame through rivets.

Afterwards, in some embodiments, rivet the lower end of the front wheel supporting tube 11 with the other ends of the lower cross tubes 14 in the cross outer frame, and rivet the upper end of the front wheel supporting tube 11 with the upper cross inner frame part 8. Following, in one example, rivet the lower end of the rear wheel supporting tube 17 with the other ends of the lower cross tubes 14 in the cross inner frame, and rivet the upper end of the rear wheel supporting tube 17 with the upper cross outer frame part 16. In some embodiments, every two corresponding hinge bases 13 riveted together can completely abut against each other to be limited when unfolded to be in a linear state.

In some embodiments, the lower cross tubes 14 fixed to the hinge bases 13 can make contact with the upper cross inner frame part 8 or the upper cross outer frame part 16 to be limited after the hinge bases 13 are folded by 90 degrees; thus, the large X-shaped single-cross structure provided with two hinge structures is formed when the hinge bases 13 are unfolded to be in a linear state.

Figure 21:
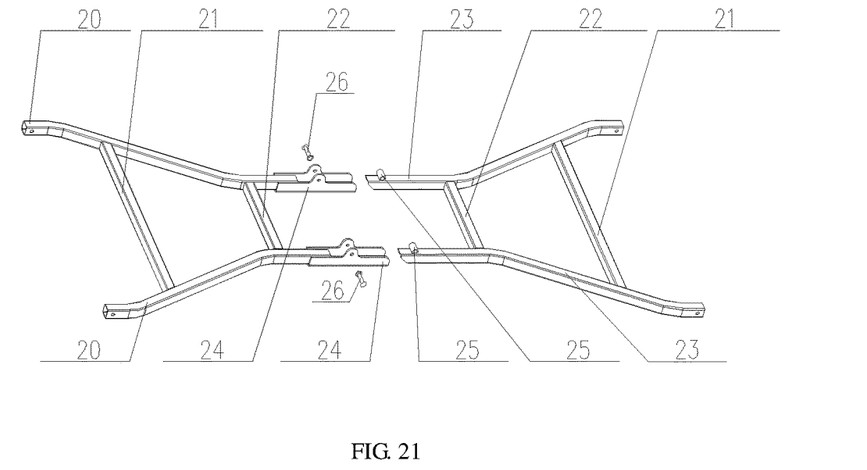
FIG. 21 is a bottom view of a bottom frame folding assembly in the unfolded state.
Figure 22:
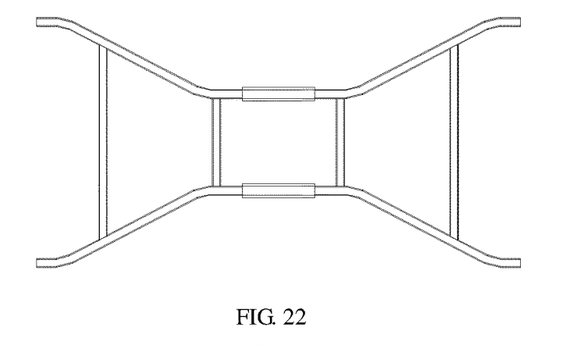
FIG. 22 is a top view of the bottom frame folding assembly in the unfolded state.
Figure 23:
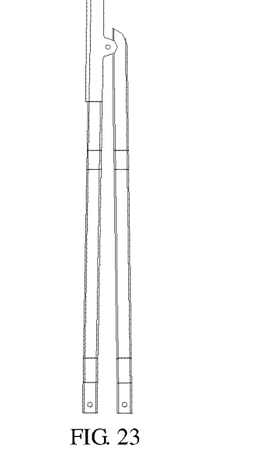
FIG. 23 is a diagram of the bottom frame folding assembly in the folded state.

As is shown in FIGS. 21-23, the bottom frame folding assembly is formed by connecting a front bottom frame assembly with a rear bottom frame through rivets 26. The front bottom frame assembly is composed of two bottom frame front longitudinal tubes 20 which are arranged symmetrically. For example, a long bottom frame cross-bracing tube 21 is welded to the widened portions of the bottom frame front longitudinal tubes; a short bottom frame cross-bracing tube 22 is welded to the narrowed portions of the bottom frame front longitudinal tubes; and two front longitudinal tube grooved components 24 are welded to the top ends of the narrowed portions of the bottom frame front longitudinal tubes.

In some embodiments, the rear frame assembly is composed of two bottom frame rear longitudinal tubes 23 which are arranged symmetrically, a long bottom frame cross-bracing tube 21 welded to the widened portions of the bottom frame rear longitudinal tubes, a short bottom frame cross-bracing tube 22 welded to the narrowed portions of the bottom frame rear longitudinal tubes, and two rear longitudinal tube axle sleeves 25 welded to the narrowed portions of the bottom frame rear longitudinal tubes.

When the bottom frame folding assembly is assembled, the narrowed sections of the rear bottom frame assembly are placed into grooves of the two front longitudinal tube grooved components 24 of the front bottom frame assembly simultaneously. Afterwards, in some embodiments, the axes of the two rear longitudinal tube axle sleeves 25 are aligned with the centers of round holes in the front longitudinal tube grooved components 24. Then the two front longitudinal tube grooved components 24 and the rear longitudinal tube axle sleeves 25 are riveted together by making two rivets 26 penetrate through the round holes of the two front longitudinal tube grooved components 24 and axle holes of the rear longitudinal tube axle sleeves 25 respectively.

Figure 7:
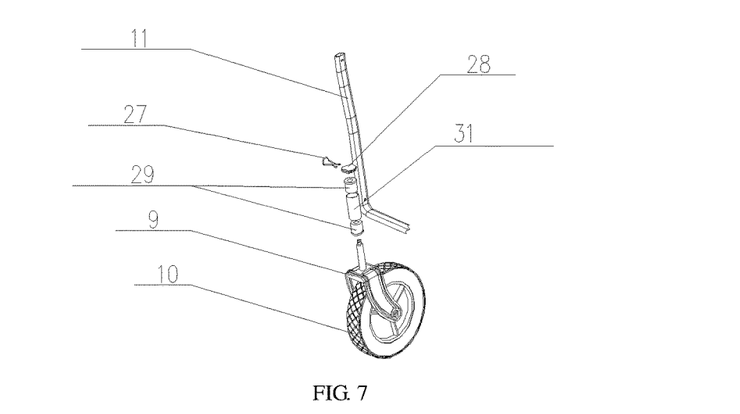
FIG. 7 is a disassembly diagram of a front wheel assembly in FIG. 1.

As is shown in FIG. 7, each front wheel assembly is composed of a front wheel carrier 9 welded to a round front wheel axle and a tire 10 riveted in the front wheel carrier 9, wherein an annular groove is formed in the upper end of the front wheel axle. When the front wheel assemblies are mounted, the front wheel axles are inserted into front wheel plastic bushings 29 inlaid in front wheel axle sleeves from bottom to top, wherein the front wheel axle sleeves are welded to the front wheel supporting tube 11; in this way, the annular grooves in the upper ends of the front wheel axles are beyond the front wheel plastic bushings 29, the number of the front wheel plastic bushings 29 is two, and steel wire clamps 27 mounted in clamp holders 28 are pushed forwards, so that the opening degree of the steel wire clamps 27 in center round holes of the clamp holders 28 is increased. At the moment, the center round holes of the clamp holders 28 are inserted into the upper ends of the front wheel axles in the axial direction, the steel wire clamps 27 are made to be located on the same plane with the annular grooves of the front wheel axles, the steel wire clamps 27 are released, then recover to the minimum opening degree states based on self elasticity and are clamped in the annular grooves of the front wheel axles, and accordingly the front wheel axles and the front wheel carriers integrated with the front wheel axles cannot move up and down in the axial direction and can only rotate. When the front wheel assemblies are dismounted, the steel wire clamps 27 are pushed forwards, and the front wheel assemblies can be pulled out from top to bottom after the opening degree of the steel wire clamps 27 is larger than that of the annular grooves of the front wheel axles.

Figure 8:
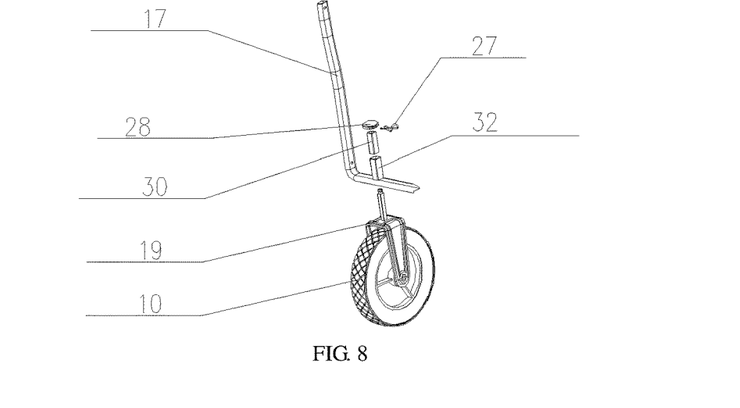
FIG. 8 is a disassembly diagram of a rear wheel assembly in FIG. 1.

As is shown in FIG. 8, each rear wheel assembly is composed of a rear wheel carrier 19 welded to a square rear wheel axle and a tire 10 riveted in the rear wheel carrier 19, wherein the upper end of the square rear wheel axle is provided with a cylindrical section and an annular groove. When the rear wheel assemblies are mounted, the square rear wheel axles are inserted into square rear wheel plastic bushings 30 inlaid in square rear wheel axle sleeves from bottom to top, wherein the square rear wheel axle sleeves are welded to the rear wheel supporting tube 17. In this way, the annular grooves in the cylindrical sections at the upper ends of the square rear wheel axles are beyond the square rear wheel plastic bushings 30, and the steel wire clamps 27 mounted in clamp holders 28 are pushed forwards. As a result, the opening degree of the steel wire clamps 27 in center round holes of the clamp holders 28 is increased.

At the moment, the center round holes of the clamp holders 28 are inserted into the annular grooves in the cylindrical sections at the upper ends of the rear wheel axles in the axial direction, the steel wire clamps 27 are made to be located on the same plane with the annular grooves in the cylindrical sections at the upper ends of the rear wheel axles, the steel wire clamps 27 are released. Following, recover to the minimum opening degree state based on self elasticity, and are clamped in the annular grooves in the cylindrical sections of the rear wheel axles, and accordingly the square rear wheel axles and the rear wheel carriers integrated with the square rear wheel axles cannot move up and down in the axial direction and cannot rotate either. When the rear wheel assemblies are dismounted, the steel wire clamps 27 are pushed forwards, and the rear wheel assemblies can be pulled out from top to bottom after the opening degree of the steel wire clamps 27 is larger than that of the annular grooves in the cylindrical sections at the upper ends of the rear wheel axles.

Figure 16:
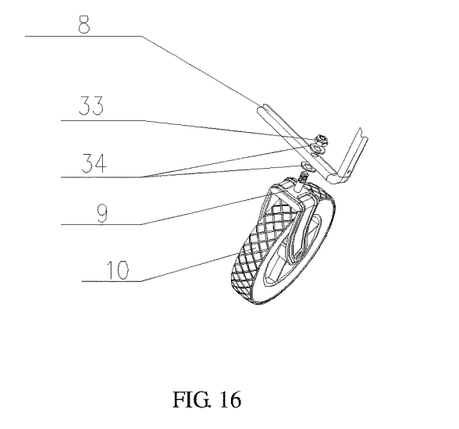
FIG. 16 is a disassembly diagram of a front wheel assembly in FIG. 2.

As is shown in FIG. 16, each front wheel assembly is composed of a front wheel carrier 9 provided with a threaded axle and a tire riveted in the front wheel carrier 9, wherein the threaded axle penetrates through a gasket and a hole in the front wheel supporting tube 11 to be fixed through a nut.

Figure 17:
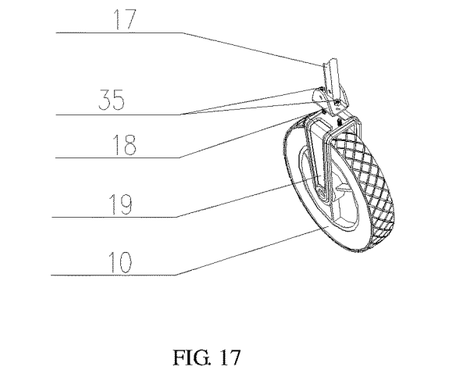
FIG. 17 is a disassembly diagram of a rear wheel assembly in FIG. 2.

As is shown in FIG. 17, each rear wheel assembly is composed of a rear wheel carrier 19 provided with two threaded axles and a tire 10 riveted in the rear wheel carrier 19, wherein the two threaded axles penetrate through two holes in a rear wheel carrier fixing piece 18 to be fixed through nuts respectively.

According to the operating process of the single-cross translational wagon of the utility model:

In step 100, when the wagon is folded, the joints where the rivets 26 in the bottom frame assembly are located are lifted upwards, so that the front bottom frame assembly and the rear bottom assembly are made to rotate around the axes of the rivets 26, and accordingly the front wheel supporting tube 11 riveted with the front bottom frame assembly and the rear wheel supporting tube 17 riveted with the rear bottom frame assembly are driven to move horizontally and draw close to the center, as is shown in FIG. 23.

In step 200, the lower cross tubes 14 are riveted with the front wheel supporting tube 11 and the rear wheel supporting tube 17 respectively, the lower cross tubes 14 pushes the two corresponding hinge bases 13 and the upper cross inner frame part 8 or the upper cross outer frame part 16 to rotate around the axes of the rivets.

Figure 5:
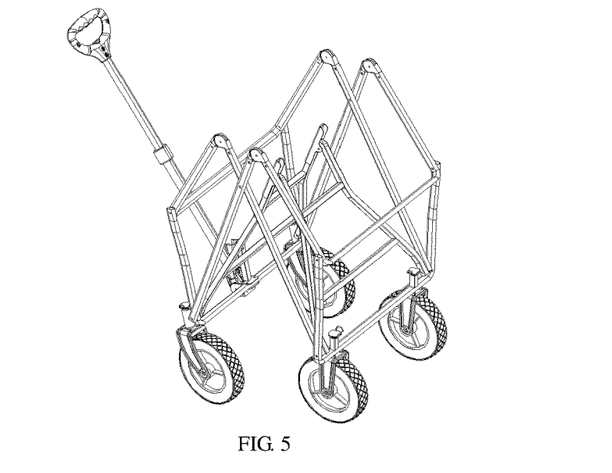
FIG. 5 is a diagram of FIG. 1 in the half-unfolded state.
Figure 14:
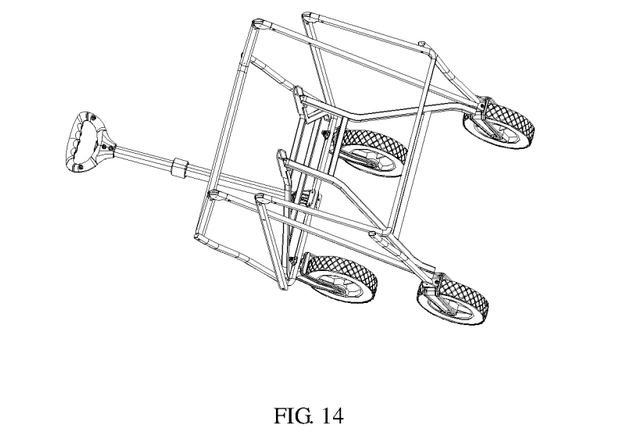
FIG. 14 is a diagram of FIG. 2 in the half-unfolded state.

In step 300, the upper end of the front wheel supporting tube 11 and the upper end of the rear wheel supporting tube 17 are riveted with the upper cross inner frame part 8 and the upper cross outer frame part 16 respectively and the lower end of the front wheel supporting tube 11 and the lower end of the rear wheel supporting tube 17 are riveted with the lower cross tubes 14 in the cross inner and outer frame parts respectively, the upper cross inner frame part 8 and the upper cross outer frame part 16 are pulled and folded inwards around the axes of the rivets, as is shown in FIG. 5 or FIG. 14.

Figure 6:
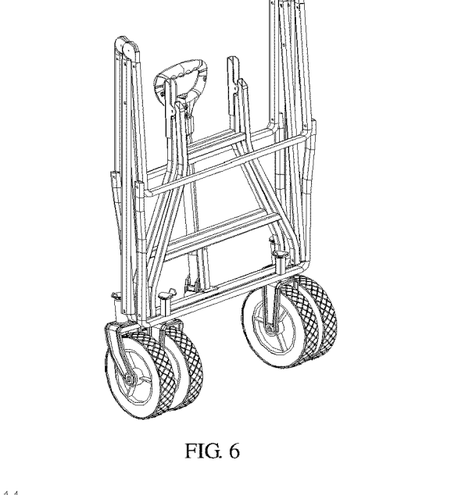
FIG. 6 is a diagram of FIG. 1 in the completely-folded state.
Figure 15:
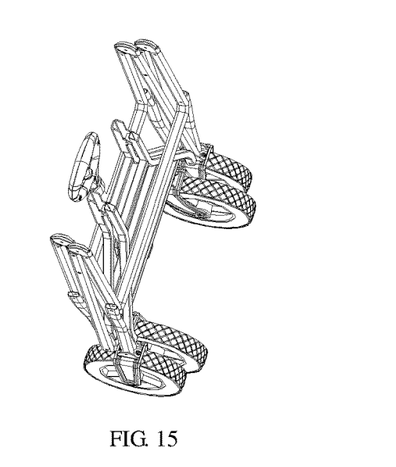
FIG. 15 is a diagram of FIG. 2 in the completely-folded state.

In step 400, the hinge bases are rotated and folded by 90 degrees, and the lower cross tubes 14 fixed to the hinge bases make contact with the upper cross inner frame part 8 or the upper cross outer frame part 16 to be folded in position, as is shown in FIG. 6 or FIG. 15.

In step 500, when the wagon is unfolded, the front longitudinal tube groove components 24 are pressed downwards, so that the front bottom frame assembly and the rear bottom frame assembly are made to rotate around the axes of the rivets 26, and the two ends of the front bottom frame assembly and the two ends of the rear bottom frame assembly are driven to horizontally stretch outwards respectively.

Figure 4:
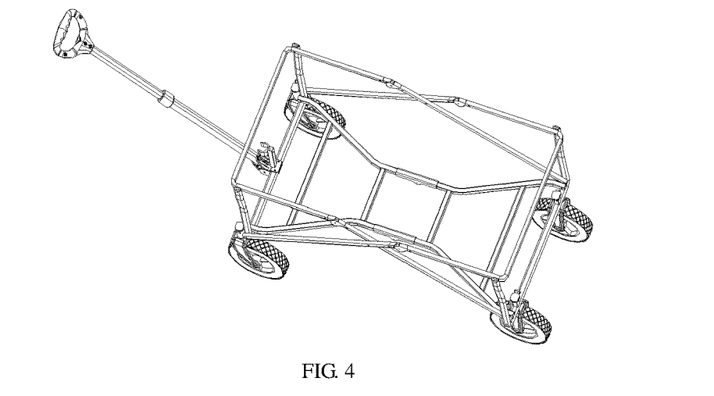
FIG. 4 is a diagram of FIG. 1 in the completely-unfolded state.
Figure 13:
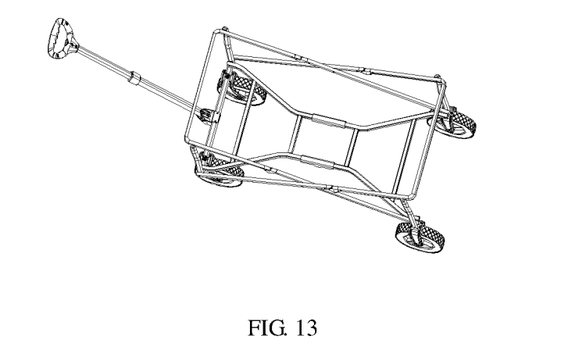
FIG. 13 is a diagram of FIG. 2 in the completely-unfolded state.

In step 600, at the moment, the lower cross tubes 14 drive the upper cross inner frame part 8 and the upper cross outer frame part 16 to rotate and stretch around the axes of the rivets of the two corresponding hinge bases 13 till the two hinge bases 13 are unfolded to be in a linear state and completely abut against each other. Meanwhile, the bottom frame rear longitudinal tubes 23 are screwed into the grooves of the front longitudinal tube grooved components 24 and abut against the upper planes of the grooves, and thus the front bottom frame assembly and the rear bottom frame assembly are unfolded horizontally, as is shown in FIG. 4 or FIG. 13.

Upon reading this specification, it should be appreciated that, under appropriate circumstances, considering such issues as user requirements or wishes, design considerations, marketing preferences, cost(s), structural requirement(s), available materials, technological advances, etc., other methods of use arrangements such as, for example, orders within above-mentioned list that are different, eliminated and/or additional steps, including or eliminating, for example, procedure, process, and/or maintenance step(s), etc., may be sufficient.

It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context.

In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, and as described herein are expressly contemplated as being equivalent within the scope of the claims and understood by those knowledgeable in the art. Therefore, obvious substitutions now or later known to one with ordinary skill in the art are defined to be within the scope of the defined elements and the reading of the specification as described herein.

The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc

What is claimed is:

1. A single-cross translational wagon comprising:
   a tow bar assembly;
   a single-cross folding assembly;
   a bottom frame folding assembly;
   front wheel assemblies; and
   rear wheel assemblies,
   wherein the tow bar assembly is positioned in front of the single-cross folding assembly, and the bottom frame folding assembly is arranged below the single-cross folding assembly; and
   wherein the single-cross folding assembly comprises a cross inner frame, a cross outer frame, a front wheel supporting tube and a rear wheel supporting tube;
   wherein the bottom frame folding assembly comprises a front bottom frame assembly and a rear bottom frame assembly;
   wherein the front bottom frame assembly comprises two bottom frame front longitudinal tubes, and the two bottom frame front longitudinal tubes are arranged symmetrically left and right and narrowed inwards from front to back; and
   wherein the rear bottom frame assembly comprises two bottom frame rear longitudinal tubes, and the two bottom frame rear longitudinal tubes are arranged symmetrically left and right and narrowed inwards from front to back.

2. The wagon of claim 1,
   wherein the cross inner frame includes an upper cross inner frame part and first lower cross tubes;
   wherein the upper cross inner frame part is in a U shape which is open backwards, the rear ends of the left and right sides of the upper cross inner frame part are provided with the two first lower cross tubes respectively; and
   wherein hinged with the front ends of the first lower cross tubes, and the rear ends of the first lower cross tubes are hinged with the lower end of the rear wheel supporting tube.

3. The wagon of claim 2,
   wherein the cross outer frame comprises an upper cross outer frame part and second lower cross tubes, the upper cross outer frame part is in a U shape which is open forwards.

4. The wagon of claim 3,
   wherein the front ends of the left and right sides of the upper cross outer frame part are provided with the two second lower cross tubes respectively and hinged with the rear ends of the second lower cross tubes.

5. The wagon of claim 4,
   wherein the front ends of the second lower cross tubes are hinged with the lower end of the front wheel supporting tube, and the second lower cross tubes are located on the outer sides of the first lower cross tubes and hinged with the first lower cross tubes in an X shape.

6. The wagon of claim 5,
   wherein the left and right sides of the front end of the upper cross inner frame part are hinged with the upper end of the front wheel supporting tube respectively, and
   wherein the front wheel assemblies are mounted at the bottom of the front wheel supporting tube, the left and right sides of the rear end of the upper cross outer frame part are hinged with the upper end of the rear wheel supporting tube respectively, and the rear wheel assemblies are mounted at the bottom of the rear wheel supporting tube.

7. The wagon of claim 1,
   wherein the front bottom frame assembly and the rear bottom frame assembly are symmetrical front and back and can be turned downwards by 90 degrees to be hinged together.

8. The wagon of claim 1, further comprising front longitudinal tube grooved components, which are open downwards, are arranged at the rear ends of the two bottom frame front longitudinal tubes respectively, rear longitudinal tube axle sleeves are arranged at the front ends of the two bottom frame rear longitudinal tubes respectively.

9. The wagon of claim 8, wherein the front ends of the two bottom frame rear longitudinal tubes are inserted into grooves of the front longitudinal tube grooved components of the two bottom frame front longitudinal tubes respectively, and meanwhile, the rear longitudinal tube axle sleeves are hinged into round holes in the front longitudinal tube grooved components through rivets respectively.

10. The wagon of claim 9, wherein the front ends of the two bottom frame front longitudinal tubes are hinged with the front wheel supporting tube respectively, and the rear ends of the two bottom frame rear longitudinal tubes are hinged with the rear wheel supporting tube respectively.

11. The wagon of claim 10, wherein long bottom frame crossbeams and short bottom frame crossbeams are arranged between the two bottom frame front longitudinal tubes and between the two bottom frame rear longitudinal tubes respectively, and the short bottom frame crossbeams are arranged on the corresponding narrowed sections.

12. The wagon of claim 11, wherein the upper cross inner frame part and the upper cross outer frame part are arranged symmetrically front and back, and the left and right sides of the upper cross inner frame part and the left and right sides of the upper cross outer frame part are all arranged horizontally.

13. The wagon of claim 12, wherein the front wheel supporting tube and the rear wheel supporting tube are each in a U shape which is open upwards.

14. The wagon of claim 13, wherein
a.) first hinge bases are mounted at the rear ends of the left and right sides of the upper cross inner frame part respectively;
b.) second hinge bases are mounted at the front ends of the first lower cross tubes, and the second hinge bases are hinged with the first hinge bases through rivets;
c.) third hinge bases are mounted at the front ends of the left and right sides of the upper cross outer frame part respectively; and
d.) fourth hinge bases are mounted at the rear ends of the second lower cross tubes, and the fourth hinges are hinged with the third hinge bases through rivets.

15. The wagon of claim 14,
wherein the tow bar assembly is a steel ball tow bar assembly; and each front wheel assembly includes a front wheel, a front wheel carrier and a front wheel axle;
wherein the front wheel is mounted on the front wheel carrier, the lower end of the front wheel axle is welded to the front wheel carrier, the upper end of the front wheel axle penetrates through the bottom of the front wheel supporting tube from bottom to top to be connected with a nut in a screwed mode, and
wherein gaskets are arranged between the nut and the front wheel supporting tube, as well as between the front wheel supporting tube and the front wheel axle.

16. The wagon of claim 15,
wherein each rear wheel assembly comprises a rear wheel, a rear wheel carrier, a rear wheel axle and a rear wheel axle fixing piece;
wherein the rear wheel is mounted on the rear wheel carrier, the lower end of the rear wheel axle is welded to the rear wheel carrier;
wherein the upper end of the rear wheel axle penetrates through the bottom of the rear wheel carrier fixing piece from bottom to top to be connected with a nut in a screwed mode, and
wherein the lower end of the rear supporting tube is hinged with the rear wheel carrier fixing piece.

17. The wagon of claim 16,
wherein each front wheel assembly includes a front wheel, a front wheel carrier, a front wheel axle and a detachable front wheel structure; and
wherein the front wheel is mounted on the front wheel carrier, the lower end of the front wheel axle is welded to the front wheel carrier, an annular groove is formed in the upper end of the front wheel axle, and the detachable front wheel structure comprises a front wheel axle sleeve, a front wheel plastic bushing, a front wheel steel wire clamp and a front wheel clamp holder.

18. The wagon of claim 17, wherein the front wheel plastic bushing is inlaid in the front wheel axle sleeve, the side wall of the front wheel axle sleeve is welded to the front wheel supporting tube, and the front wheel steel wire clamp is in a U shape with the two side edges in concave V shapes and is mounted on the front wheel clamp holder in an openable mode.

19. The wagon of claim 18,
wherein the front wheel clamp holder comprises an upper portion and a lower portion, a guide post matched with the front wheel steel wire clamp is arranged in the space between the upper portion and the lower portion of the front wheel clamp holder, which is used for mounting the front wheel steel wire clamp; and
wherein the upper portion and the lower portion of the front wheel clamp holder are connected through the guide post, and center round holes are further formed in the bottoms of the upper portion and the lower portion of the front wheel clamp holder and communicate with the space used for mounting the front wheel steel wire clamp.

20. The wagon of claim 19,
wherein the upper end of the front wheel axle sequentially penetrates through the front wheel plastic bushing and the front wheel steel wire clamp from bottom to top to be matched with the center round holes in the front wheel clamp holder, and meanwhile, the front wheel steel wire clamp is clamped in the annular groove in the front wheel axle; and
wherein each rear wheel assembly comprises a rear wheel, a rear wheel carrier, a rear wheel axle and a detachable rear wheel structure, wherein the rear wheel is mounted on the rear wheel carrier, the lower end of the rear wheel axle is welded to the rear wheel carrier, an annular groove is formed in the upper end of the rear wheel axle, and the detachable rear wheel structure includes a rear wheel axle sleeve, a rear wheel plastic bushing, a rear wheel steel wire clamp and a rear wheel clamp holder; and
wherein the rear wheel plastic bushing is inlaid in the rear wheel axle sleeve.

21. The wagon of claim 19, wherein the rear wheel steel wire clamp is in a U shape with the two side edge in concave V shapes and is mounted on the rear wheel clamp holder in an openable mode, the rear wheel clamp holder comprises an upper portion and a lower portion, a guide post matched with the rear wheel steel wire clamp is arranged in the space between the upper portion and the lower portion of the rear wheel clamp holder, which is used for mounting the rear wheel steel wire clamp.

22. The wagon of claim 21,
wherein the upper portion and the lower portion of the rear wheel clamp holder are connected through the guide post, and center round holes are further formed in the bottoms of the upper portion and the lower portion of the rear wheel clamp holder and communicate with the space used for mounting the rear wheel steel wire clamp; and
wherein the upper end of the rear wheel axle sequentially penetrates through the bottom of the rear wheel supporting tube, the rear wheel plastic bushing and the rear wheel steel wire clamp from bottom to top to be matched with the center round holes in the rear wheel clamp holder, and meanwhile, the rear wheel steel wire clamp is clamped in the annular groove in the rear wheel axle.

* * * * *